3,068,233
METHOD FOR PREPARING N,N'-DIMETHYLTRI-
ETHYLENEDIAMMONIUM DINITRATE AND
HOMOLOGUES THEREOF
Philip H. Moss, Austin, Tex., assignor to Jefferson Chemical Company, Inc., Houston, Tex., a corporation of Delaware
No Drawing. Filed June 14, 1960, Ser. No. 35,917
6 Claims. (Cl. 260—268)

This invention relates to a N,N'-dimethyltriethylenediammonium dinitrate and its homologues and, in particular, to an improved method for preparing these compounds.

N,N'-dimethyltriethylenediammonium dinitrate is a complex compound represented by the formula:

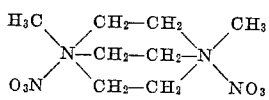

A useful homologue of the above is represented by the formula:

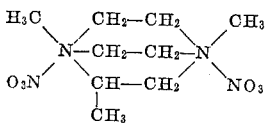

N,N'-dimethyltriethylenediammonium dinitrate has been prepared by the reaction of silver nitrate with N,N'-dimethyltriethylenediammonium dibromide wherein the latter is converted to the corresponding dinitrate while silver bromide is formed and precipitated out of solution. N,N'-dimethyltriethylenediammonium dibromide for the foregoing reaction is obtained by reacting N,N'-dimethylpiperazine with ethylene dibromide. The reaction of N,N'-dimethyltriethylenediammonium dibromide with silver nitrate, while effective, is prohibitively expensive for use in a commercial process.

A method for the efficient and economical production of N,N'-dimethyltriethylenediammonium dinitrate and its homologues has now been discovered. According to this invention a dimethyltriethylenediammonium dihalide or homologue thereof is reacted in an aqueous medium with moderate excesses of nitric acid and of an alkylene oxide. The latter two reactants may be added simultaneously to the reaction mixture or in sequence with the nitric acid addition preceding the alkylene oxide. The reaction is illustrated by the following formula in which the alkylene oxide is ethylene oxide:

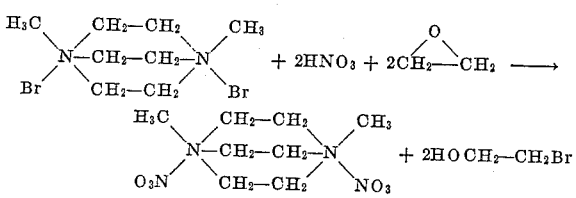

It is essential that this reaction be conducted at a relatively low temperature since moderately elevated temperatures induce severe decomposition of the intermediate reaction product. A suitable temperature range for the reaction is from about 0° C. to 40° C., with the preferred range being from 10 to 30° C. Lower temperatures may also be effectively employed but are less desirable.

An aqueous medium is essential for the instant reaction but the amount of water employed is not a critical feature. In general, the reaction is favored by a relatively concentrated solution. It has been found convenient to employ amounts of water approximately equivalent to the weight of the dihalide starting reactant but amounts ranging from one half to about twice the weight of the dihalide reactant may be employed.

Dimethyltriethylenediammonium dibromide or dichloride are employed as the principal starting reactants in this reaction, the dibromide being preferred. Either compound is reacted with moderate excesses of nitric acid and of an alkylene oxide to effect the reaction. Generally, a molar excess of nitric acid in the range of 2% to 30% over the dimethyltriethylenediammonium dihalide may be employed. At least a mol or more of an alkylene oxide should be used per mol of nitric acid, the molar proportion ranging from 1:1 to 1.5:1. The nitric acid and the alkylene oxide reactants may be added simultaneously or sequentially, the nitric acid addition preceding the addition of the alkylene oxide in the latter instance.

Various alkylene oxides may be employed for this reaction. In general, they will correspond to the formula:

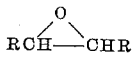

in which R is hydrogen or an alkyl radical having 1 to 8 carbon atoms, preferably a lower alkyl radical having 1 to 3 carbon atoms. Suitable alkylene oxides include ethylene oxide, propylene oxide and the like.

It is generally desirable to employ nitric acid of 70% or commercial concentration for the instant reaction although concentrations from 50% and above may be employed. As noted above, the molar amount of acid should range from about 2% to about 30% in excess of the dimethyltriethylenediammonium dihalide. On completion of the reaction, the excess nitric acid remaining in the product is neutralized with an alkaline reacting material, such as an alkali or alkaline earth hydroxide, prior to the recovery steps.

The following example illustrates the practice of this invention.

Example

A solution of 453 grams (1.5 mols) of dimethyltriethylenediammonium dibromide in admixture with an equal weight of water was stirred and cooled as 285 grams (3.15 mols) of 70% nitric acid was added. The temperature was maintained at 7° to 13° C. This solution was then stirred at 10–16° C. while 188 grams (4.27 mols) of ethylene oxide was passed in over a two hour period. At the end of this reaction period, a test for the bromide ion was found to be only faintly positive, indicating that the reaction was essentially complete. The excess nitric acid in the reaction product was neutralized by stirring the solution with 6 grams of calcium hydroxide followed by removal of the excess calcium hydroxide by filtration.

The reaction product was divided into two portions for recovery purposes. The first portion was vacuum stripped, while adding 500 grams of water during distillation to aid in the azeotropic distillation of ethylene bromohydrin. When removal of the water was essentially complete, the dinitrate salt was recrystallized from 600 milliliters of methanol and 25 milliliters of water. The product weighing 146 grams, equivalent to a 92% yield, and contained 0.1% of the bromide.

The second portion was extracted with six 100 grams portions of methylisobutyl ketone and then vacuum stripped. The semi-dried product was recrystallized from 700 milliliters of methanol and 27 milliliters of water. The yield was 223 grams and, on analysis, was found to contain 0.3% bromine.

It is obvious that many modifications of the foregoing invention may be made without departing from the spirit and scope thereof, and therefore only such limitations should be imposed as are indicated in the appended claims.

I claim:

1. A method for preparing an N,N'-dimethyltriethylenediammonium dinitrate which comprises reacting an aqueous solution of a compound selected from the group consisting of N,N'-dimethyltriethylenediammonium dihalide and its homologues with a molar excess of nitric acid and a molar amount of an alkylene oxide at least equivalent to said nitric acid at a temperature in the range of 0° to 40° C.

2. A method for preparing an N,N'-dimethyltriethylenediammonium dinitrate which comprises reacting an aqueous solution of a compound selected from the group consisting of N,N'-dimethyltriethylenediammonium dibromide and its homologues with a 2% to 30% molar excess of nitric acid and a molar amount of an alkylene oxide at least equivalent to said nitric acid at a temperature in the range of 10° to 30° C.

3. A process according to claim 1 in which the molar amounts of said alkylene oxide to said nitric acid is in the range of 1:1 to 1.5:1.

4. A process according to claim 1 in which said dinitrate is N,N'-dimethyltriethylenediammonium dinitrate.

5. A process according to claim 1 in which said alkylene oxide is ethylene oxide.

6. A process according to claim 1 in which 0.5 to 2 parts by weight of water based on said N,N'-dimethyltriethylenediammonium dibromide are employed.

References Cited in the file of this patent

FOREIGN PATENTS

| | | |
|---|---|---|
| 159,562 | Australia | Nov. 2, 1954 |
| 735,631 | Great Britain | Aug. 24, 1955 |
| 798,488 | Great Britain | July 23, 1958 |

OTHER REFERENCES

Mann et al.: Jour. Chem. Soc. (London), 1954, pages 4476–4480.